May 18, 1943                J. BOLSEY                2,319,204
CINEMATOGRAPHIC FADING DEVICE
Filed June 27, 1941
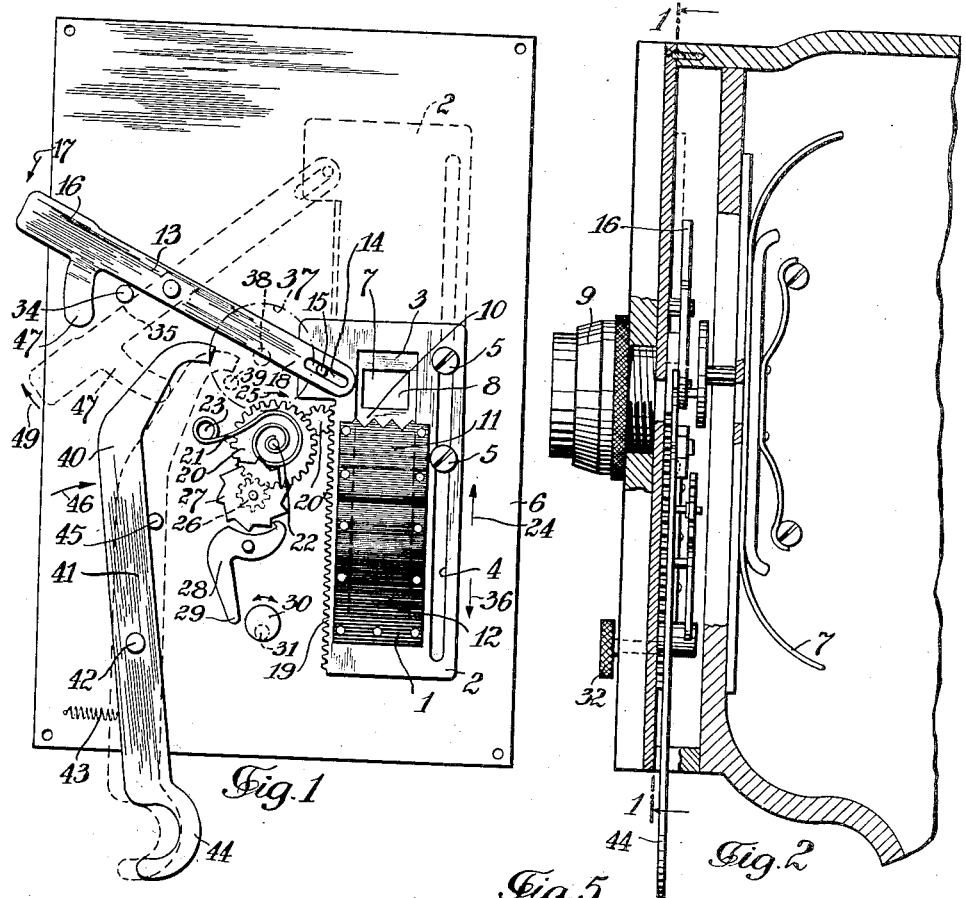
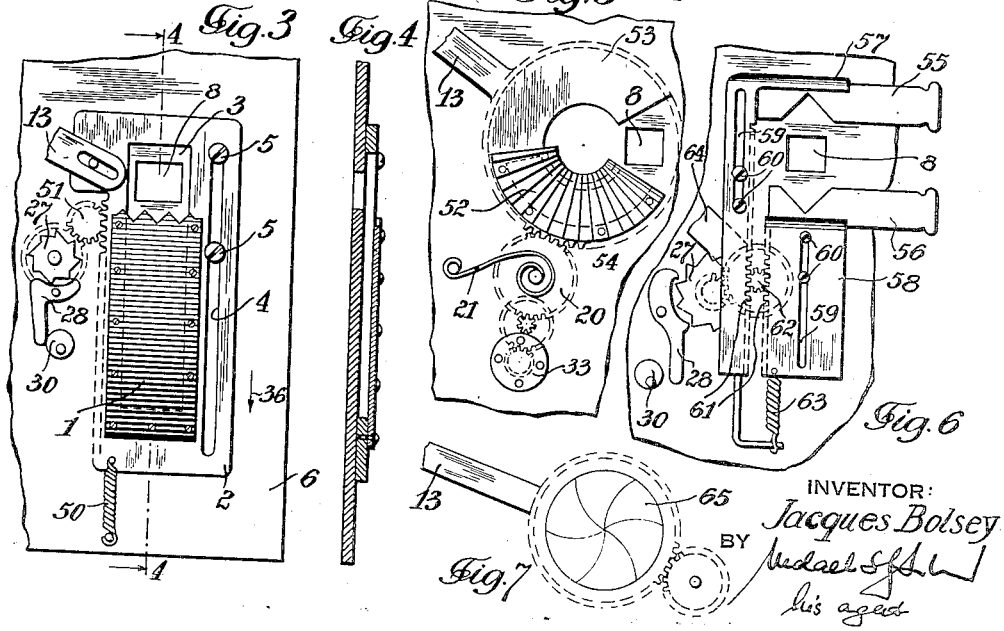
INVENTOR:
Jacques Bolsey Patented May 18, 1943

2,319,204

UNITED STATES PATENT OFFICE 2,319,204

CINEMATOGRAPHIC FADING DEVICE

Jacques Bolsey, New York, N. Y.

Application June 27, 1941, Serial No. 400,049

17 Claims. (Cl. 88—16)

My present invention relates to motion picture cameras, and more particularly to means for producing fading-in and fading-out, and the like, in such cameras.

It is known to use for this purpose light-reducing members arranged movable to and fro in front of the film gate through which the light rays impinge on the film moving past this film gate.

It is an object of my present invention to regulate, i. e., to equalize the speed of the movement of these light-reducing members during fading-in and fading-out.

It is a further object of my invention to provide for one of the fading operations, e. g. for fading-in, motor-like means, for instance, a spring motor whilst carrying out the other fading operation, i. e., the fading-out by hand.

It is still a further object of my invention to provide a mechanism by which the spring motor is wound up during the fading operation carried out by hand.

It is another object of my invention to provide speed regulating means equalizing the speed of the light-reducing member during both operations, thereby attaining equal speed of the member while driven by the spring motor and while operated by hand.

It is still another object of my invention to couple the hand-operated means for moving the light-reducing member with the spring motor in such a manner that the motor is wound up automatically by operating the hand-operated means.

Still another object of my invention consists in combining with the means for operating the light-reducing member means automatically blocking the movement of the film at the end of the hand-operated fading periods.

Still a further object of my invention consists in providing separate means for releasing the above film movement blocking means by hand, when required.

With the above objects in view, I propose to provide in a motion picture camera, including a film gate and driving means for moving a film past said film gate, a unit for producing fading-in and fading-out, which unit may be built into said camera or attached thereto; this unit has to comprise in combination a movable light-reducing member in the path of the light rays impinging through said film gate on said film, means for moving said light-reducing member to and fro in front of said film, said moving means including a spring motor adapted to move said light-reducing member in one direction, hand-operated means for moving said member in the opposite direction and simultaneously winding up said spring motor, and a speed regulating mechanism for keeping the to and fro movement of said light-reducing member substantially constant.

In accordance with a preferred embodiment of my invention, the means for producing fading-in and fading-out are combined with operating means comprising blocking means adapted to block the movement of the film by said film driving mechanism, blocking means adapted to block the movement of said light-reducing member by said spring motor in direction opposite to its movement by hand, both blocking means associated with said hand-operated means for moving said light-reducing member and operated by it in such a manner as to block simultaneously the movements of the light-reducing member and the film at the end of the hand-operated fading periods, and one single hand-operated member co-operating with both blocking means and adapted to release them both simultaneously, when required.

The novel features which I consider as characteristic for my invention are set forth in particular in the appended claims. The invention itself, however, both as to its construction and its method of operation, together with additional objects and advantages thereof will be best understood from the following description of specific embodiments, when read in connection with the accompanying drawing, in which:

Fig. 1 is a plane view of the front plate of the camera seen in direction of arrows 1—1, screwed-off from the camera casing, with the entire fading-in and fading-out mechanism;

Fig. 2 is a cross-section of the mechanism shown in Fig. 1, with a part of the camera casing and the film drawing mechanism;

Fig. 3 is a fragmentary view of another embodiment of my invention;

Fig. 4 is a cross-section of the embodiment shown in Fig. 3, along line 4—4 of Fig. 3;

Figs. 5, 6 and 7 are fragmentary plane views of three further embodiments of my invention.

The embodiment shown in Fig. 1 comprises a neutral grey wedge 1 serving as light reducing member. This grey wedge is screwed to the carrier plate 2; the latter is provided with a longitudinal aperture 3 corresponding substantially to the shape of grey wedge 1. Guiding means, consisting of a slot 4 and pins 5 secured to the front wall 6 of the camera are provided in order to enable sliding of the grey wedge 1 to and fro in front of the film 7; this film is exposed through film gate 8 to the light rays entering the camera through lens 9. The grey wedge consists, as usual, of differently transparent portions; it does not fully cover aperture 3, forming thereby at its one end a free aperture portion 10 for unobstructed exposure of the film. In the embodiment shown, the upper grey wedge portion 11 is much lighter than the lower wedge portion 12; the density of the wedge increases continuously from its upper to its lower edge, as indicated in Fig. 1.

In accordance with my present invention, this grey wedge 1 and the carrying member 2 are shifted by hand from the position indicated in full lines to the position indicated in dotted lines and shifted back by a spring motor from this position into the position indicated in full lines.

In order to enable this to and fro movement, I provide a double-armed lever 13 engaging, by means of slit 14, pin 15 secured to the carrying plate 2. By turning lever arm 16 by hand in direction of arrow 17, lever arm 18 is raised and shifts the carrying member 2 and the grey wedge 1 in direction of arrow 24 into the position indicated by dotted lines.

As indicated above, I propose to provide means adapted to wind up, by turning lever arm 16 in direction of arrow 17, a spring motor for shifting the grey wedge in direction of arrow 36, from its position indicated in dotted lines into its position shown in full lines. These means consist of a toothed rack 19 along one edge of carrying member 2, pinion 20' meshing with this cam, and gear 20 being in mesh with pinion 20'. One end of spring 21 is secured to shaft 22 of gear 20, while the other end of this spring is secured by means of pin 23 to the front wall 6. Thus, it is evident that by moving carrier plate 2 in the direction of arrow 24, gear 20 is rotated in direction of arrow 25, and the spring 21 is wound up. Being wound up, the spring is adapted to move the carrier plate 2 and grey wedge 1 in direction of arrow 36 from their position shown in dotted lines into their position shown in full lines.

In order to keep the speed of the carrier plate 2 and the grey wedge 1 during their to and fro movement, i. e., during their operation by hand and their operation by spring motor, substantially constant and equal to each other, I provide speed-regulating braking means cooperating with the above described spring motor, keeping the speed of the rotating elements of this motor, and thereby also the speed of the carrier member 2, constant.

In the embodiment shown in Fig. 1, these speed-regulating means include a pinion 26 meshing with gear 20 and ratchet wheel 27 arranged coaxially with pinion 26, and an oscillating pawl 28 meshing ratchet wheel 27, and thus braking its speed of rotation in the known manner. Oscillating pawl 28 is provided with a lever-like arm 29 striking cam 30 during each oscillation; this cam is excentrically secured to shaft 31 rotatably journalled in front wall 6, and carrying at its other end knob 32; by turning the knob 32 it is possible to change the position of cam 30 and to vary the deflection of oscillation of lever 29, thus regulating the speed of ratchet wheel 27 and the grey wedge mechanism connected therewith. It should also be stressed that I do not want to be limited to this specific speed regulating mechanism only; I may also employ a fly-wheel speed regulator 33 as shown in Fig. 5 instead of the mechanism shown in Fig. 1, or use other regulating means if they are adapted to control the speed of grey wedge 1, as necessary.

It also should be emphasized that I may connect this speed regulating mechanism directly with the light-reducing members, i. e. with grey wedge 1 and carrier plate 2, by arranging, for instance, pinion 26 in such a manner that it meshes rack 19 directly. Thus, the combination of any speed regulating mechanism with my new light-reducing member and the mechanism operating it, lies within the scope of my present invention.

I have found it advantageous to operate the light-reducing member during fading-out periods by hand, and to drive it during fading-in periods by the spring motor; it is essential for the light-reducing member to remain, after fading-out by hand, in fading-out position, enabling thereby consecutive fading-in by motor without any further preparations. For this purpose, I provide means adapted to block the movement of the light-reducing member in direction of arrow 36 at the end of the hand-operated fading periods. These blocking means consist of a spring button 34 arranged resiliently movable, normal to the plane of lever 13. Thus, if lever 13 reaches the position shown in dotted lines, the spring button 34 contacts the lever edge 35 and holds the lever, in spite of action of spring 21, in this position. In order to release this blocking spring button 34 it is only necessary to move lever arm 16 by hand in direction of arrow 49, pushing button 34 back. Thereby lever 13 is freed for turning in direction of arrow 49 and spring 21 now is able to move carrier plate 2 together with grey wedge 1 unobstructed in direction of arrow 36.

As indicated above, it is also an object of my present invention to coordinate the movement of my new fading device with the movement of the film, i. e., it is my aim to provide means by which the film movement is started automatically at the beginning of fading-in periods and blocked automatically at the end of the fading-out periods.

In order to attain this aim I provide a disk 37 cooperating by means of shaft 38 with the film driving mechanism, not shown in the drawing, in such a way that the movement of the film 7 is blocked when the rotation of this disk is stopped and the film movement is started when the blocking means blocking rotation of disk 37 are released.

In order to block and release disk 37, a pin 39 is secured to this disk. Lever arm 40 of the double-armed lever 41, journalled to the front wall 6 by means of pivot 42, engages pin 39 when lever 41 is in the position shown in dotted lines. When lever 41 is moved by hand against action of spring 43 at its projecting trigger-like arm 44 out of contact with pin 39, disk 37 starts to rotate, starting thereby also the movement of film 7.

In order to avoid undesired engagement of lever arm 40 with pin 39 a second spring button 45 is arranged in such a manner that it blocks turning of lever 41 in direction of arrow 46 when in the position indicated in full lines. This spring button 45 prevents engagement of lever arm 40 with pin 39 until the lever arm is moved in direction of arrow 46. This movement can be attained by pressing trigger 44 by hand in direction of arrow 46; in case automatic blocking of the film movement by operation of the fading device is required, lever arm 40 and the double-armed lever 13 have to cooperate in such a way that lever arm 40 is automatically pushed in direction of arrow 46 when lever arm 16 of the double-armed lever 13 is pushed down by hand. For this purpose I provide a lever-like extension 47 on lever arm 16 which is adapted to strike against and to push during its rotation in direction of arrow 17 lever arm 40 in direction of arrow 46, thereby forcing it to engage pin 39 and to stop movement of film 7.

The mode of operation of the fading-in and fading-out mechanism shown in Figs. 1 and 2 is the following:

In picture-taking position, i. e., after fading-in the double-armed levers 13, 41 and the plate carrier 2 with grey wedge 1 are in the position shown in full lines. When fading-out is desired, lever arm 16 is pushed down in direction of arrow 17. During the pushing-down of lever arm 16 grey wedge 1 is shifted into fading-out position, indicated in dotted lines, and simultaneously spring 21 is wound up. When the lever arm 16 reaches the position shown in dotted lines, it strikes against and pushes lever 41 against action of spring button 45 into the position shown in dotted lines, engaging thereby pin 39 and blocking further rotation of disk 37 and further movement of film 7. The lever 13 is held in pushed-down, fading-out position by spring button 34.

In order to carry out fading-in, trigger 44 is pulled by hand to the right. Thereby lever arm 40 releases pin 39, starting the movement of film 7; simultaneously, lever arm 40 strikes against extension 47, turning lever 16 against action of spring button 34 in direction of arrow 49. Thus, lever 13 is freed to turn in direction of arrow 49, and spring 21 is able to shift grey wedge 1 in direction of arrow 36 from its position shown in dotted lines into its position shown in full lines. When grey wedge 1 reaches the position shown in full lines, it is again in the picture-taking position mentioned above, and the fading-out and fading-in cycle starts once more, as described above.

The above description clearly shows how easy and simple the operation of my new device is: For fading-in I have only to pull trigger 44, and for fading-out I have only to push down lever 17. By each of these operations not only the fading device itself is operated, but also the film movement is stopped and started, as needed. The speed regulating device keeps the movement of the light reducing members automatically constant and equal during the fading-in and fading-out operations, as described above.

The other embodiments shown in the drawing, substantially correspond to the embodiment shown in Figs. 1 and 2. Therefore, in the following I will describe only briefly the specific differing features of each embodiment, without describing in detail the features which are common to all.

The embodiment shown in Figs. 3 and 4 comprises a separate spring 50 for moving the grey wedge in direction of arrow 36 and separate speed regulating means of the type shown in Fig. 1 for keeping the speed of the grey wedge constant. These speed regulating means cooperate with rack 19 directly by means of the additional pinion 51 instead of cooperating with the spring motor, as shown in Fig. 1.

The characteristic feature of the embodiment shown in Fig. 5 is an annular grey wedge 52 secured to the circular wedge carrier 53, rotating past film gate 3. In this case I use a toothed circumferential portion 54 of the wedge carrier 53 instead of rack 19 for engagement with the spring motor. Lever 13 has to be modified to some extent, but the alterations being necessary are so slight that it seems superfluous to describe them in detail.

Figs. 6 and 7 show embodiments with mask plates instead of a grey wedge.

In Fig. 6 two mask plates 55 and 56 are interchangeably carried by carrier plates 57 and 58, sliding by means of slits 59 and pins 60 toward and from each other. Each of the carrier plates 57 and 58 is provided with a toothed rack 61 meshing with pinion 62; spring 63 is arranged in such a manner that it tends to move the two carriers and the mask plates carried by them toward each other, enabling thereby fading-out. For fading-in purposes lever 64 corresponding substantially to lever 13 of the embodiment shown in Fig. 1 has to be pushed down.

In Fig. 7 an embodiment is shown in which diaphragm-like mask plates 65 are used for fading-in and fading-out purposes.

It will be understood that each of the elements described above, or two or more together, may also find a useful application in other types of fading-in and fading-out mechanisms differing from the types described above.

While I have illustrated and described the invention as embodied in motion picture cameras, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalency of the following claims.

What I claim as new and desire to secure by Letters Patent is:

1. In a motion picture camera means for producing fading-in and fading-out, and the like, comprising a film gate, driving means for moving a film past said film gate, a movable light reducing member in the path of the light rays impinging through said film gate on said film, means for moving said light reducing member to and fro in front of said film, said moving means including a spring motor adapted to move said light reducing member in one direction, hand-operated means for moving said member in the opposite direction and simultaneously winding up said spring motor, a speed regulating mechanism for braking the speed of the to and fro movement of said light reducing member and keeping the same substantially constant, and blocking means operated by said hand-operated means for moving said light reducing member, said blocking means adapted to block the movement of the film by said film driving mechanism at the end of each hand-operated fading period.

2. In a motion picture camera means for producing fading-in and fading-out, and the like, comprising a film gate, driving means for moving a film past said film gate, a movable light reducing member in the path of the light rays impinging through said film gate on said film, means for moving said light reducing member to and fro in front of said film, said moving means including a spring motor adapted to move said light reducing member in one direction, hand-operated means for moving said member in the opposite direction and simultaneously winding up said spring motor, a speed regulating mechanism for keeping the to and fro movement of said light reducing member substantially constant, and blocking means adapted to block at the end of the hand-operated fading periods automatically the movement of said light reducing member by said spring motor.

3. In a motion picture camera means for producing fading-in and fading-out, and the like, comprising a film gate, driving means for moving a film past said film gate, a movable light reducing member in the path of the light rays impinging through said film gate on said film, means for moving said light reducing member to and fro in front of said film, said moving means including a spring motor adapted to move said light reducing member in one direction, hand-operated means for moving said member in the opposite direction and for simultaneously winding up said spring motor, a speed regulating mechanism for keeping the to and fro movement of said light reducing member substantially constant, means adapted to block the movement of said light reducing member by said spring motor, and hand-operated means for releasing said blocking means, when required.

4. In a motion picture camera means for producing fading-in and fading-out, and the like, comprising a film gate, driving means for moving a film past said film gate, a movable light reducing member in the path of the light rays impinging through said film gate on said film, means for moving said light reducing member to and fro in front of said film, said moving means including a spring motor adapted to move said light reducing member in one direction, hand-operated means for moving said member in the opposite direction and for simultaneously winding up said spring motor, a speed regulating mechanism for keeping the to and fro movement of said light reducing member substantially constant, means adapted to block the movement of said light reducing member by said spring motor at the end of the hand-operated fading periods, and hand-operated means for releasing said blocking means, when required.

5. In a motion picture camera means for producing fading-in and fading-out, and the like, comprising a film gate, driving means for moving a film past said film gate, means adapted to block the movement of said film by said film driving mechanism, a movable light reducing member in the path of the light rays impinging through said film gate on said film, means for moving said light reducing member to and fro in front of said film, said moving means including a spring motor adapted to move said light reducing member in one direction, hand-operated means for moving said member in the opposite direction and for simultaneously winding up said spring motor, a speed regulating mechanism for keeping the to and fro movement of said light reducing member substantially constant, means adapted to block the movement of said light reducing member by said spring motor, and hand-operated means adapted to release simultaneously said blocking means for the light reducing member and said film movement blocking means, when required.

6. In a motion picture camera means for producing fading-in and fading-out, and the like, comprising a film gate, driving means for moving a film past said film gate, a movable light reducing member in the path of the light rays impinging through said film gate on said film, means for moving said light reducing member to and fro in front of said film, said moving means including a spring motor adapted to move said light reducing member in one direction, hand-operated means for moving said member in the opposite direction and for simultaneously winding up said spring motor, a speed regulating mechanism for keeping the to and fro movement of said light reducing member substantially constant, blocking means adapted to block the movement of the film by said film driving mechanism, and blocking means adapted to block the movement of said light reducing member by said spring motor in direction opposite to its movement by hand, both blocking means associated with said hand-operated means for moving said light-reducing member and operated by it in such a manner as to block simultaneously the movements of the light reducing member and the film at the end of the hand-operated fading periods.

7. In a motion picture camera means for producing fading-in and fading-out, and the like, comprising a film gate, driving means for moving a film past said film gate, means adapted to block the movement of said film by said film driving mechanism, a movable light reducing member in the path of the light rays impinging through said film gate on said film, means for moving said light reducing member to and fro in front of said film, said moving means including a spring motor adapted to move said light reducing member in one direction, hand-operated means for moving said member in the opposite direction and for simultaneously winding up said spring motor, and a speed regulating mechanism for keeping the to and fro movement of said light reducing member substantially constant, means adapted to block the movement of said light reducing member by said spring motor, and one single hand-operated member cooperating with both said blocking means and adapted to release both of them simultaneously, when required.

8. In a motion picture camera means for producing fading-in and fading-out, and the like, comprising a film gate, driving means for moving a film past said film gate, a movable light reducing member in the path of the light rays impinging through said film gate on said film, means for moving said light reducing member to and fro in front of said film, said moving means including a spring motor adapted to move said light reducing member in one direction, hand-operated means for moving said member in the opposite direction and for simultaneously winding up said spring motor, and a speed regulating mechanism for keeping the to and fro movement of said light reducing member substantially constant, blocking means adapted to block the movement of the film by said film driving mechanism, blocking means adapted to block the movement of said light reducing member by said spring motor in direction opposite to its movement by hand, both blocking means associated with said hand-operated means for moving said light-reducing member and operated by it in such a manner as to block simultaneously the movements of the light reducing member and the film at the end of the hand-operated fading periods, and one single hand-operated member cooperating with both blocking means and adapted to release them both simultaneously, when required.

9. In a motion picture camera means for producing fading-in and fading-out, and the like, comprising a film gate, driving means for moving a film past said film gate, a movable light reducing member in the path of the light rays impinging through said film gate on said film, means for moving said light reducing member to and fro in front of said film, said moving means including a spring motor adapted to move said light reducing member in one direction, hand-operated means adapted to move said light reducing member in the opposite direction and simultaneously to wind up said spring motor, a speed regulating mechanism adapted to keep the to and fro movement of said light reducing member substantially constant, and blocking means adapted to block at the end of the hand-operated fading periods the movement of said hand-operated means opposite its movement during operation by hand.

10. In a motion picture camera means for producing fading-in and fading-out, and the like, comprising a film gate, driving means for moving a film past said film gate, a movable light reducing member in the path of the light rays impinging through said film gate on said film, means for moving said light reducing member to and fro in front of said film, said moving means including a spring motor adapted to move said light reducing member in one direction, hand-operated means adapted to move said light reducing member in the opposite direction and simultaneously to wind up said spring motor, a speed regulating mechanism adapted to keep the to and fro movement of said light reducing member substantially constant, blocking means adapted to block at the end of the hand-operated fading periods the movement of said hand-operated means opposite its movement during operation by hand, and blocking means operated by said hand-operated means for moving said light-reducing member adapted to block the movement of said film by said film driving mechanism at the end of each hand-operated fading period.

11. In a motion picture camera means for producing fading-in and fading-out, and the like, comprising a film gate, driving means for moving a film past said film gate, a movable light reducing member in the path of the light rays impinging through said film gate on said film, means for moving said light reducing member to and fro in front of said film, said moving means including a spring motor adapted to move said light reducing member in one direction, hand-operated means adapted to move said light reducing member in the opposite direction and simultaneously to wind up said spring motor, a speed regulating mechanism adapted to keep the to and fro movement of said light reducing member substantially constant, blocking means adapted to block at the end of the hand-operated fading periods the movement of said hand-operated means opposite its movement during operation by hand, blocking means operated by said hand-operated means for moving said light reducing member adapted to block the movement of said film by said film driving mechanism at the end of each hand-operated fading period, and one single hand-operated member cooperating with both blocking means and adapted to release them both simultaneously, when required.

12. In a motion picture camera means for producing fading-in and fading-out, and the like, comprising a film gate, driving means for moving a film past said film gate, a movable light reducing member in the path of the light rays impinging through said film gate on said film, means for moving said light reducing member to and fro in front of said film, said moving means including a spring motor adapted to move said light reducing member in one direction, a double-armed lever adapted to be turned by hand at one lever arm and to move with the other lever arm said light reducing member in the opposite direction and simultaneously to wind up said spring motor, a speed regulating mechanism adapted to keep the to and fro movement of said light reducing member substantially constant, blocking means adapted to block at the end of the hand-operated fading periods the movement of said double-armed lever opposite its movement during operation by hand, and blocking means operated by said double-armed lever adapted to block the movement of said film by said film driving mechanism at the end of each hand-operated fading period.

13. In a motion picture camera means for producing fading-in and fading-out, and the like, comprising a film gate, driving means for moving a film past said film gate, a movable light reducing member in the path of the light rays impinging through said film gate on said film, means for moving said light reducing member to and fro in front of said film, said moving means including a spring motor adapted to move said light reducing member in one direction, a first double-armed lever adapted to be turned by hand at one lever arm and to move with the other lever arm said light reducing member in the opposite direction and simultaneously to wind up said spring motor, a speed regulating mechanism adapted to keep the to and fro movement of said light reducing member substantially constant, blocking means adapted to block at the end of the hand-operated fading periods the movement of said first double-armed lever opposite its movement during operation by hand, blocking means operated by said first double-armed lever adapted to block the movement of said film by said film driving mechanism at the end of each hand-operated fading period, and a second double-armed lever adapted to be turned by hand at one lever arm and to release with the other lever arm both said blocking means simultaneously, when required.

14. In a motion picture camera, means for producing fading-in and fading-out, and the like, comprising a film gate, driving means for moving a film past said film gate, a movable neutral grey wedge in the path of the light rays impinging through said film gate on said film, means for moving said neutral grey wedge to and from in front of said film, said moving means including a spring motor adapted to move said neutral grey wedge in one direction, hand-operated means for moving said neutral grey wedge in the opposite direction and simultaneously winding up said spring motor, a speed regulating mechanism for keeping the to and fro movement of said neutral grey wedge substantially constant, and blocking means adapted to block at the end of the hand-operated fading periods automatically the movement of said neutral grey wedge by said spring motor.

15. In a motion picture camera, means for producing fading-in and fading-out, and the like, comprising a film gate, driving means for moving a film past said film gate, two movable mask plates in the path of the light rays impinging through said film gate on said film, means for moving said mask plates to and fro in front of said film, said moving means including a spring motor adapted to move said mask plates in one direction, hand-operated means for moving said plates in the opposite direction and for simultaneously winding up said spring motor, a speed regulating mechanism for keeping the to and fro movement of said mask plates substantially constant, means adapted to block the movement of said mask plates by said spring motor, and hand-operated means for releasing said blocking means, when required.

16. In a motion picture camera, means for producing fading-in and fading-out, and the like, comprising a film gate, driving means for moving a film past said film gate, a movable interchangeable light reducing member in the path of the light rays impinging through said film gate on said film, means for moving said interchangeable light reducing member to and fro in front of said film, said moving means including a spring motor adapted to move said interchangeable light reducing member in one direction, hand-operated means for moving said member in the opposite direction and for simultaneously winding up said spring motor, a speed regulating mechanism for keeping the to and fro movement of said interchangeable light reducing member substantially constant, means adapted to block the movement of said interchangeable light reducing member by said spring motor at the end of the hand-operated fading periods, and hand-operated means for releasing said blocking means, when required.

17. In a motion picture camera, means for producing fading-in and fading-out, and the like, comprising a film gate, driving means for moving a film past said film gate, means adapted to block the movement of said film by said film driving mechanism, two moveable interchangeable mask plates in the path of the light rays impinging through said film gate on said film, means for moving said interchangeable mask plates to and fro in front of said film, said moving means including a spring motor adapted to move said interchangeable mask plates in one direction, hand-operated means for moving said plates in the opposite direction and for simultaneously winding up said spring motor, a speed regulating mechanism for keeping the to and fro movement of said interchangeable mask plates substantially constant, means adapted to block the movement of said interchangeable mask plates by said spring motor, and hand-operated means adapted to release simultaneously said blocking means for the interchangeable mask plates and said film movement blocking means, when required.

JACQUES BOLSEY.